United States Patent [19]
Saunders et al.

[11] Patent Number: 6,091,703
[45] Date of Patent: Jul. 18, 2000

[54] BULK DESPREADING OF MULTIPLE INDEPENDENT CDMA SOURCES

[75] Inventors: Oliver W. Saunders, Los Angeles; Jean A. Develet, Jr., Rancho Palos Verdes, both of Calif.

[73] Assignee: TRW Inc., Redondo Beach, Calif.

[21] Appl. No.: 08/942,247

[22] Filed: Oct. 10, 1997

[51] Int. Cl.[7] .............................. H04B 7/216; H04J 11/00
[52] U.S. Cl. ............................................ 370/210; 370/320
[58] Field of Search ...................................... 370/316, 320, 370/324, 335, 342, 441, 479, 503, 515, 210; 375/200, 364, 365, 366, 367, 140, 141, 142, 143, 144, 145

[56] References Cited

U.S. PATENT DOCUMENTS

| | | | |
|---|---|---|---|
| 5,696,762 | 12/1997 | Natali et al. | 370/320 |
| 5,822,359 | 10/1998 | Bruckert et al. | 375/145 |
| 5,838,669 | 11/1998 | Gerakoulis | 370/320 |
| 5,898,362 | 4/1999 | Ibanez-Meier et al. | 370/320 |
| 5,910,945 | 6/1999 | Garrison et al. | 370/324 |
| 5,966,373 | 10/1999 | Stephenson et al. | 370/335 |
| 5,995,497 | 12/1997 | Gerakoulis | 370/320 |

*Primary Examiner*—Chau Nguyen
*Assistant Examiner*—Soon-Dong Hyun
*Attorney, Agent, or Firm*—Michael S. Yatsko

[57] ABSTRACT

A communications system (100) is disclosed for processing at least one uplink channel contained in at least one uplink beam (112) transmitted to a satellite (106). The communications system (100) includes at least one user terminal (110) that extracts a system clock, a synchronization word, and timing correction information from a downlink beam transmitted by a satellite. The user terminal includes a timing controller (226) that aligns uplink channel transmissions by generating a system clock based on the downlink symbol clock, said synchronization word, and said timing correction information. The user terminal includes at least one spread-spectrum spreader (254) for encoding at least one uplink channel, and a transmitter connected to the spread-spectrum spreader (254) for transmitting said at least one uplink channel in an uplink beam (112). The system also includes a satellite (106) which generates the synchronization word, downlink symbol clock, and the timing correction information needed by the user terminal. The satellite also includes a wideband FFT processor (322) that extracts uplink channels from the uplink beam (112) in bulk, and a despreader (326) connected to the FFT processor (322) for simultaneously despreading user signals contained in said uplink channels.

29 Claims, 4 Drawing Sheets

BULK DESPREADING OF MULTIPLE INDEPENDENT CDMA SOURCES

BACKGROUND OF THE INVENTION

The present invention relates to satellite communication systems. More particularly, the present invention relates to a system and method that allows a satellite to process multiple spread-spectrum uplink channels, for example, Code Division Multiple Access (CDMA) channels, without substantially increasing the required satellite hardware.

CDMA is a technique used to communicate large amounts of information contained in many user signals simultaneously and at low power levels using a large bandwidth. CDMA is generally considered a "spread-spectrum" technology. In operation, CDMA spreads the information contained in a particular user signal over a much greater bandwidth than the original user signal. Starting from a rate of approximately 9.6 Kilobits per second (9.6 Kbps), for example, CDMA may spread user signals to a transmitted rate of approximately 1.23 Megabits per second. In accomplishing spreading, CDMA applies orthogonal codes to the data bits associated with user signals. The resulting coded data bits may then be transmitted along with the user signals of all the other users without appreciable interference by merging the coded data bits with a pseudo-random noise (PN) sequence. When the composite signal is received, the orthogonal code applied to a particular user signal is removed in a process called "despreading" that separates the user signal out from the composite signal and returns the user signal to its original rate.

The military is a traditional user of spread spectrum technology. Because the user signal is spread out along a wide bandwidth, it is very difficult to jam, difficult to interfere with, and difficult to even discover that the user signal is in the air. Due to the low transmission power levels and spreading effect of the digital codes, the composite signal appears as nothing more than a slight rise in the existing "noise floor". Other technologies, for example, Time Division Multiple Access (TDMA) tend to concentrate large amounts of information and power in a small portion of bandwidth, thus making the transmission much easier to detect and interfere with.

CDMA technology is also applied in the digital mobile telephone market and offers numerous advantages for its users. Among these advantages are that the apparent capacity of a CDMA system may be 8 to 10 times larger than that of traditional analog cellular systems, such as Advanced Mobile Phone Service (AMPS) and 4 to 5 larger than that of a digital cellular system such as the Global System for Mobile communications (GSM) system. A CDMA system may also enjoy improved call quality and enhanced privacy as well as provide longer battery life for portable phones.

CDMA is poised to take a major role in future communications systems. After first entering commercial service in Hong Kong in 1995, CDMA is now in commercial service in, for example, the United States, Korea, Canada, India, and China.

Along with the need to communicate large amounts of information is the need to communicate that information via satellite. Satellites provide wide ranging coverage of large parts of the planet and can easily send signals where it is impossible or uneconomical to place physical conductors like copper wire or fiber optic cable.

Today, however, satellite uplinks, may consist of hundreds of simultaneous users, particularly if the uplinks carry CDMA transmissions. A single satellite may have, for example, 30 or 40 uplink transponders (essentially receive antennas), each able to accept an uplink beam with a bandwidth of 250 MHz. The resultant total uplink data path would then have a capacity of nearly 8 to 10 gigabits per second.

CDMA is capable of generating massive amounts of data for an uplink beam to carry. Transmission systems may, for example, divide the 250 MHz uplink beam bandwidth into lower bandwidth uplink channels (twenty 12.5 MHz uplink channels, for example). Each uplink channel may then use CDMA techniques to carry data channels for hundreds of users. In order for a conventional satellite to despread and decode the data channel for each user, the satellite would have to carry hundreds (perhaps thousands) of sets of heavy, complex decoding electronics, and generate enormous amounts of power. Additional circuitry, of course, leads to a corresponding increase in required power and satellite size.

Increasing the size, weight, and onboard power of a satellite so that it can decode more data channels drives up the cost of the satellite dramatically. Not only does the satellite itself become more expensive because of the additional circuitry and solar panels used to provide onboard power, but it also costs more to launch the satellite because larger rockets and more propellant are required to put the satellite into orbit. Satellite size, weight, and power restrictions thereby prohibit the satellite from handling the large numbers of data channels that modern communications techniques can generate.

Thus a need is present in the industry for an improved communications system, which overcomes the disadvantages discussed above and previously experienced.

BRIEF SUMMARY OF THE INVENTION

It is therefore an object of the present invention to allow a single satellite to process numerous CDMA uplink channels efficiently.

It is therefore an object of the present invention to enable a satellite to process CDMA uplink channels without a significant increase in the size of the satellite.

It is an object of the present invention to enable a satellite to process CDMA uplink channels without a significant increase in weight of the satellite.

It is another object of the present invention to enable a satellite to process uplink channels without a significant increase in power required by the satellite.

It is a further object of the present invention to increase the total number of data channels a single satellite may process.

The present invention includes a user terminal that is responsible for transmitting user signals to a satellite. Before transmitting, the user terminal monitors a downlink beam broadcast by the satellite to acquire initial timing information (a symbol clock), a synchronization word that appears at regular intervals in the downlink beam, and a timing correction value. The user terminal generates an initial system clock based on the symbol clock, then transmits a timing correlation code to the satellite. The transmission of the timing correlation code is offset from the timing of the synchronization word by the timing correction value.

The satellite receives the timing correlation code, compares its arrival to the satellite internal symbol clock, and generates revised timing correction information. The timing correction information represents an adjustment to the amount of time the terminal waits from the synchronization word before transmitting. The satellite sends the timing correction information to the user terminal, which receives the timing correction information and adjusts its time delay accordingly to achieve synchronization.

Once in synchronization, the user terminal reinitializes its timing and code word generators and begins to process user signals. Each user signal may be spread and combined with many additional user signals in a CDMA fashion for transmission to the satellite in a single uplink channel, for example.

In the satellite, the received CDMA uplink channel is processed by hardware that separates out individual uplink channels and then despreads the user signals contained within the uplink channels. The despreading hardware may incorporate a Fast Hadamard Transform (FHT) and would be used, for example, in conjunction with Walsh-Hadamard spreading codes in the user terminal. In the case where multiple uplink channels are present in a single uplink beam, the satellite may use an FFT processor to separate out the individual uplink channels. Each individual output of the FFT processor may be connected an FHT despreader. The outputs of the FHT despreader are individual user signals, which may then be processed in any desired manner, including conventional demodulation, switching, or multiplexing.

DETAILED DESCRIPTION OF THE INVENTION

Figure 1:
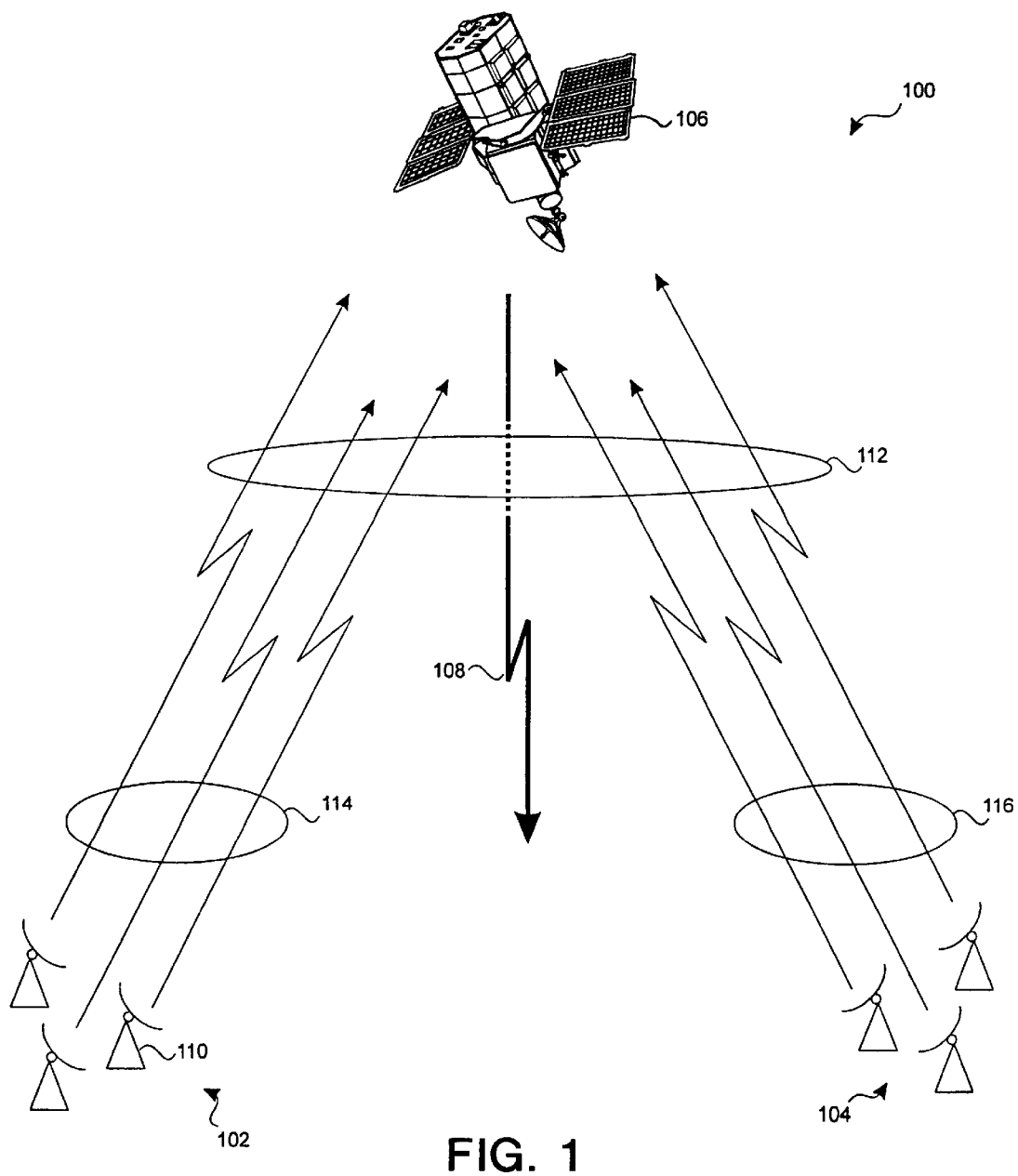
FIG. 1 shows a communications system including user terminals and a satellite.

Turning now to FIG. 1, that figure shows a diagram of a communications system 100 including a first group of user terminals 102 and a second group of user terminals 104 in communication with a satellite 106. Both groups of user terminals 102 and 104 communicate with the satellite 106 by transmitting in the bandwidth assigned to a single uplink beam (for example, a 250 MHz bandwidth assigned to a predetermined satellite transponder). As noted above, the uplink beam bandwidth may be divided into numerous lower bandwidth uplink channels. In FIG. 1, the group of user terminals 102 communicates in the frequency range allocated to a first uplink channel 114 in the uplink beam, while the group of user terminals 104 communicates in the frequency range allocated to a second uplink channel 116 in the same uplink beam. In FIG. 1, the uplink channels 114 and 116 form the uplink beam 112.

In addition, each of the uplink channels may support the simultaneous transmission of data channels provided by numerous users through the use of spread spectrum transmission techniques, for example CDMA. The number of users supported by a single uplink channel depends in part on the number of orthogonal codes available to the groups of user terminals 102 and 104. Although FIG. 1 shows groups of user terminals 102 and 104 containing three user terminals, in practice many more user terminals may be added to those transmitting on the same uplink channel. As will be explained in more detail below, each additional user terminal applies an orthogonal code to its transmission to prevent interference with other transmissions in the same uplink channel. Thus the structure of FIG. 1 includes user terminals generating data channels which are grouped into uplink channels in an uplink beam.

The satellite 106 communicates, in part, with the groups of user terminals 102 and 104 through the downlink beam 108. In general, all user terminals transmitting in the same uplink beam receive the downlink beam 108. The downlink beam 108 includes regular data transmissions destined for the various user terminals as well as special timing control information.

In a preferred embodiment, the groups of user terminals 102 and 104 extract two pieces of timing control information from the downlink beam 108. The first piece of timing control information is a symbol clock reference. The symbol clock reference is an inherent part of the structure of the downlink beam 108 which is produced as a natural consequence of the satellite 106 transmitting data to the ground.

The groups of user terminals 102 and 104 recover the symbol clock in the downlink beam 108 during the process of downlink demodulation and bit synchronization. In general, user terminals using the same uplink beam will synchronize their internal symbol clocks to the symbol clock reference provided for that uplink beam in the downlink beam 108.

The second piece of timing control information provided in the downlink beam 108 is a regularly transmitted synchronization word. The role of the synchronization word will be discussed below.

Figure 2:
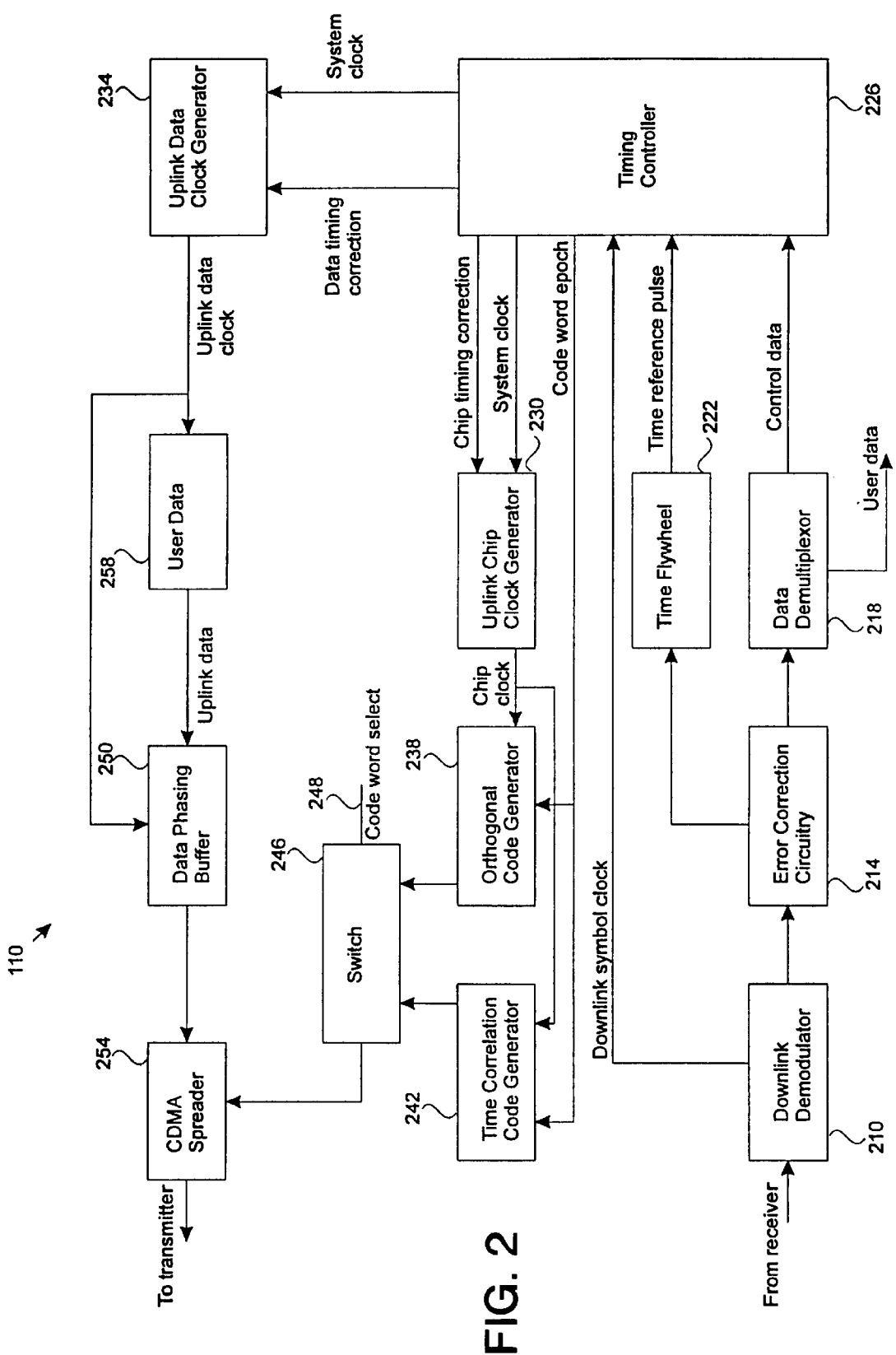
FIG. 2 shows a block diagram of a user terminal including timing, synchronization, and signal spreading blocks.

Turning now to FIG. 2, it shows a block diagram representative of an individual terminal 110 in the groups of user terminals 102 and 104. The individual terminal 110 includes a downlink demodulator 210, error correction circuitry 214, a data demultiplexor 218, a time flywheel 222, and a timing controller 226. Also included in the individual terminal 110 are an uplink chip clock generator 230, an uplink data clock generator 234, an orthogonal code generator 238, a time correlation code generator 242, a switch 246 with a code word select line 248, a data phasing buffer 250, and a CDMA spreader 254. User data 258 also flows through the individual terminal 110 and will be communicated to the satellite 106 in an uplink channel in the first uplink beam.

Figure 3:
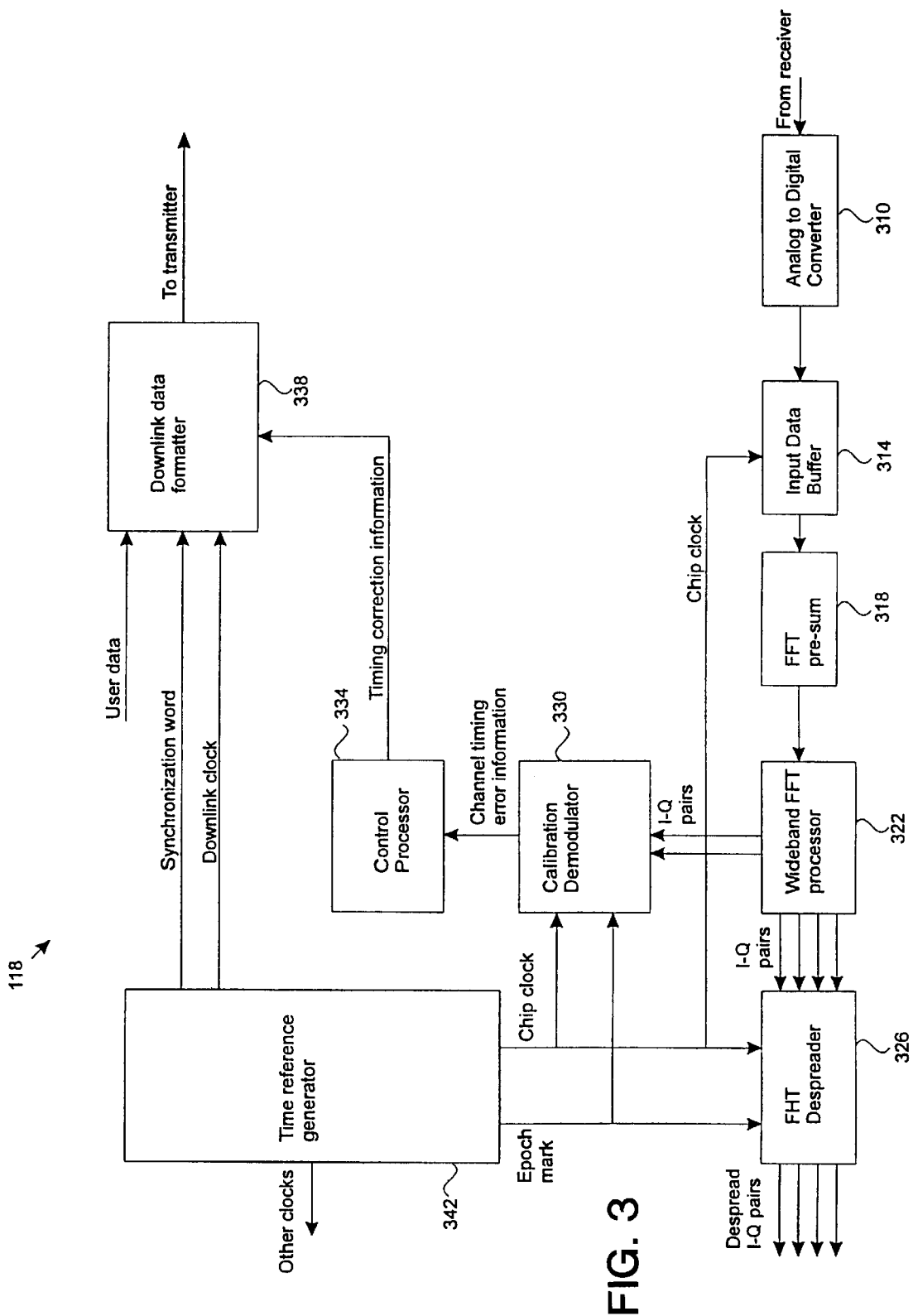
FIG. 3 shows a block diagram of a satellite, including uplink channel processing and time reference generators.

Turning next to FIG. 3, a block diagram of the satellite 106 is illustrated. The satellite 106 includes an analog to digital (A/D) converter 310, a data input buffer 314, a Fast Fourier Transform (FFT) pre-sum stage 318, a wideband FFT processor 322, and a Fast Hadamard Transform (FHT) despreader 326. The satellite 106 also includes a calibration demodulator 330, a control processor 334, a downlink data formatter 338, and a time reference generator 342.

In operation, the individual terminal 110 begins by synchronizing with the reference timing running in the satellite 106. Returning to FIG. 2, the individual terminal 110 begins the synchronization process by monitoring the downlink beam 108 for timing control information. The individual terminal 110 uses the downlink demodulator 210 to remove the modulation from the downlink data carried by the downlink beam 108. The downlink demodulator 210 also contains the circuitry necessary to establish bit synchronization with the downlink beam 108. The data in the downlink beam 108 may be modulated with, for example, Quadrature Phase Shift Keying (QPSK), Binary Phase Shift Keying (BPSK), or another efficient digital modulation scheme.

As explained above, the timing control information present in the downlink beam 108 includes a synchronization word and an inherent symbol clock reference. In general, a symbol may be considered to be an encoded, modulated piece of a larger signal that represents a predetermined number of bits of information. In QPSK, for example, each symbol represents two bits of information.

The downlink demodulator 210 locks onto the symbol clock reference and forwards it to the timing controller 226. In response, the timing controller generates a system clock to synchronize the first user terminal with the satellite 106. After demodulation, the downlink data is checked for errors.

The error correction circuitry 214 detects and corrects errors in the downlink data before further processing occurs. The error correction circuitry 214 may take advantage of any error correcting or error checking codes applied to the downlink data before transmission. For example, Cyclic Redundancy Check (CRC) coded downlink data may be checked for errors, while more sophisticated codes such as Hamming codes may detect and correct certain errors in the downlink data. The error correction circuitry 214 also detects the anticipated data pattern of the synchronization word transmitted in the downlink beam 108 and sends it to the time flywheel 222. The synchronization word is used to control the timing of the start of transmission of code words, which are collections of symbols. Corrected downlink data that is control information (for example, a reset command) is sent by the downlink data demultiplexor 218 to the timing controller 226, while corrected downlink data of other types (for example, user data) may be sent to other processing units (not shown) in the individual terminal 110.

The time flywheel 222 establishes a synchronization word time reference for the individual terminal 110. The synchronization word is a time marker to which the individual terminal 110 aligns its code word transmission. The time flywheel 222 predicts the presence of the synchronization word in the downlink beam 108 based on an anticipated repetition frequency and data pattern for the synchronization word (this information may be programmed into the individual terminal 110 before it starts operation). The repetition period may be a multiple of the code word length used in the individual terminal 110 (the code word length is the total length of a predetermined number of symbols transmitted by the individual terminal 110). As an example, the repetition rate for the synchronization word may be equal to one every 100 code words. Each time the synchronization word appears, the timing controller 226 may adjust its system clock so that the timing of code words transmission by the individual terminal 110 is more closely matched to the satellite 106 reference clocks.

When the time flywheel 222 receives the same predicted synchronization word from the error correction circuitry 214 at the anticipated interval a predetermined number of successive times, the time flywheel 222 determines that synchronization has, in fact, been established and forwards a timing reference pulse to the timing controller 226. The timing reference pulse is used to control the timing of code word transmissions by the individual terminal 110. The number of repetitions necessary to establish synchronization can be varied and may, for example, be 3 or more.

The timing controller 226 takes the symbol clock reference from the downlink demodulator 210 and the timing reference pulse from the time flywheel 222 and uses them to generate a system clock. The system clock frequency is generally locked to the symbol clock reference provided by the downlink beam 108, although timing corrections may be made by the timing controller 226 according to instructions from the satellite 106. The symbol clock reference provided by the satellite 106 thus establishes a common symbol transmit rate for the uplink data in the uplink channel used by the individual terminal 110.

Figure 4A:
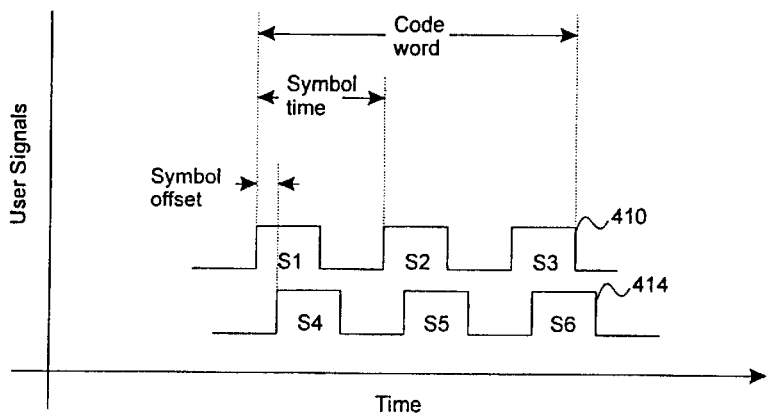
FIG. 4a shows a first set of timing relationships between two user signals in which the signals are slightly out of alignment.

Timing corrections may be required to align data channel symbols and code words in the uplink channels sent in the uplink beam 112 with the rest of the symbols and code words sent in the other uplink channels present in the uplink beam 112. Referring to FIG. 3, these timing corrections will allow the satellite 106 to process the uplink channels efficiently, as will be described in more detail below. FIG. 4a shows a timing diagram illustrating the timing parameters of interest. A first user signal 410 is shown that consists of symbols S1, S2, and S3 that are transmitted in a first uplink channel in the uplink beam 112. A second user signal 414 is also shown that consists of symbols S4, S5, and S6 that are transmitted in a second uplink channel in uplink the beam 122.

Continuing with reference to FIG. 4a, Symbols S1, S2, and S3 together form a code word in the first user signal 410, and symbols S4, S5, and S6 form a code word in the second user signal 414. The symbols are shown in a simplified format so that the timing relationships may be more clearly described. In practice, the symbols may be modulated and encoded such that they would not, of course, appear to be square wave signals. Furthermore, the number of symbols that constitute a code word may vary considerably from implementation to implementation. FIG. 4a also shows the symbol time for the symbols. As described above, the first user signal 410 and the second user signal 414 share the same symbol time, as both will be transmitted on the same uplink beam 112.

Turning to FIG. 2, the symbol time depends on the system clock generated by the timing controller 226, which in turn is generally locked to the symbol clock reference transmitted in downlink beam 108. The system clock is used to generate a chip clock, which directly controls the rate at which user data 258 is encoded or spread for transmission in an uplink channel. Because the symbols are modulated pieces of the spread user data, the symbol clock reference also controls the symbol time. Each piece of encoded user data spread into the uplink channel is called a "chip". The satellite 106 may adjust the user terminal 110 chip clock through the symbol clock reference to provide a transmitted chip rate of, for example, 5–30 million chips per second, although other faster and slower rates are also attainable.

Initially, the first user signal 410 and the second user signal 414 may reach the satellite 106 out of alignment with each other. This is indicated in FIG. 4a as a symbol offset. The symbol offset may be caused by a variety of factors including initial (startup) timing uncertainties, satellite 106 orbit eccentricities, and unexpected satellite 106 movement. Because unexpected changes in the uplink channel propagation to the satellite 106 may occur, the satellite 106 may allow its control processor 334 to evaluate the alignment of the user signals periodically, possibly as a background process. If the control processor detects a misalignment in the user signals above a preset threshold, it may then transmit new timing adjustment information to some or all of the user terminals communicating with the satellite 106. The user terminals would then respond by adjusting their internal clocks to bring the user signals back into alignment.

The satellite 106 receives the first user signal 410 and the second user signal 414 in the first uplink beam 112. The satellite 106 periodically monitors the alignment of the signals it receives and transmits timing correction information down to the user terminals through the downlink beam 108. A misalignment of approximately one-quarter of a chip may be tolerated without correction by the satellite 106. With respect to the user signals 410 and 414 shown in FIG. 4a, the satellite may communicate a timing correction command to the sender of the second user signal 414 in order to bring the first user signal 410 and second user signal 414 into alignment.

Figure 4B:
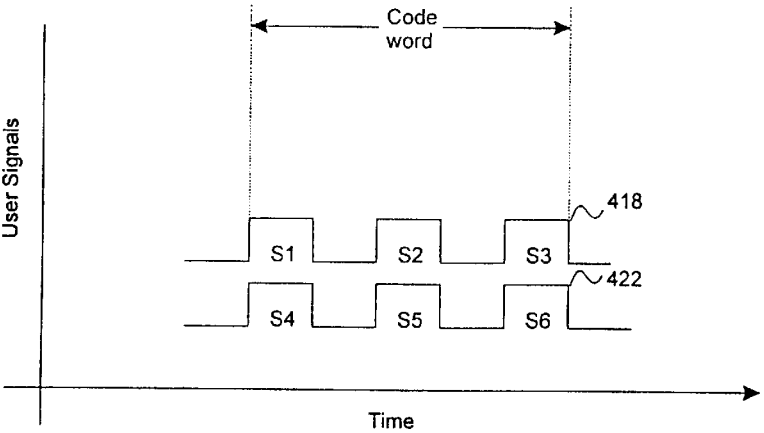
FIG. 4b shows a set of timing relationships between two user signals in which the signals are in alignment.

Two aligned user signals are shown in FIG. 4b as a first aligned user signal 418 and a second aligned user signal 422. Note that the timing adjustment sent by the satellite 106 not only has the effect of aligning the symbols in the aligned user signals 418 and 422, but it also aligns the code words in the aligned user signals 418 and 422 as well. When the code words are substantially aligned, they are considered to be in the same "epoch" (and thus two code words in the same epoch may generally be considered to be in alignment). The ability of the satellite 106 to align the code words is one step in allowing the satellite 106 to efficiently process the aligned user signals 418 and 422.

Figure 4C:
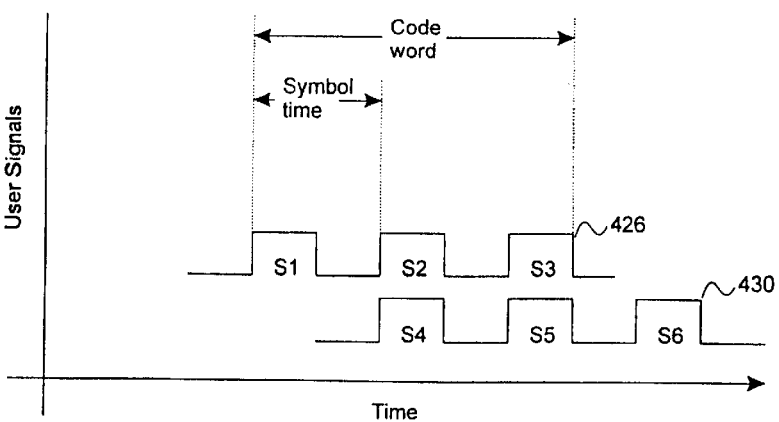
FIG. 4c shows a second set of timing relationships between two user signals in which the code words are not in alignment.

An example of user signals that are out of alignment even though the individual symbols are aligned is shown in FIG. 4c. In FIG. 4c, a first unaligned signal 426 and a second unaligned signal 430 are shown offset by one symbol. Thus, the satellite 106 receives symbols from the unaligned signals 426 and 430 simultaneously, but does not receive the code words in the unaligned signals 426 and 430 simultaneously. Again, the satellite 106 may correct the misalignment by transmitting timing correction information to the sender of either of the unaligned signals 426 or 430 to bring the signals into the alignment shown in FIG. 4b.

The first user terminal 110 may perform an initial time alignment using the system clock it has recovered from the downlink beam 108. The first step in this process is to generate a chip clock for the user terminal 110. The uplink chip clock generator 230 shown in FIG. 2 provides a chip clock that may be used by the time correlation code generator 242 to generate timing codes (a particular type of orthogonal code) for initial time alignment, or by the orthogonal code generator 238 to select orthogonal codes for CDMA spreading. Note that the switch 246 controls whether the output of the time correlation code generator 242 or the orthogonal code generator 238 is sent to the CDMA spreader 254. Thus, the switch 246 acts like a multiplexer under control of the code word select line 248. For initial timing alignment, the code word select input causes the switch 246 to connect the output of the time correlation code generator 242 to the CDMA spreader 254.

The timing codes used by the time correlation code generator 242 are chosen such that the satellite 106 can more easily detect the code and calculate timing correction information. Barker codes are generally acceptable for use by the time correlation code generator 242 because of their excellent auto-correlation properties. The satellite 106 receives the timing codes and computes any timing correction necessary to bring the uplink channels in the user terminal into alignment with other uplink channels in the uplink beam 112. The timing correction information is then transmitted to the first user terminal 110.

Once the user terminal 110 has completed its time alignment, it may proceed to send the user data 258 to the satellite 106. The user terminal 110 sets the code select line of the switch 246 to select the output of the orthogonal code generator 238. The orthogonal code generator 238 may either contain or may be able to generate (through fast logic, for example) orthogonal codes that can be used to encode user data for transmission to the satellite 106. Orthogonal codes generally suitable include those with minimal self interference properties. Examples of such codes include Walsh codes and Walsh-Hadamard codes. In a preferred embodiment, the orthogonal code generator 238 uses Walsh-Hadamard codes because they also have a corresponding Fast Hadamard Transform which the satellite 106 may use to quickly and efficiently decode the Walsh-Hadamard encoded user data.

In order to transmit the user data 258, the user terminal 110 provides the system clock generated by the timing controller 226 to an uplink data clock generator 234. In a preferred embodiment of the invention, the uplink data clock generator 234 produces an uplink data clock that clocks data out of the data phasing buffer 250 in such a manner that it arrives coincident with the orthogonal codes generated by the orthogonal code generator 238. Alternatively, the user data 258 may be timed directly from the uplink data clock and connected directly to the CDMA spreader 254.

The CDMA spreader 254 generates a wideband signal containing the encoded user data according to CDMA coding principles. The wideband signal is then transmitted in an uplink channel to the satellite 106, modulation and power amplification (not shown).

There is no inherent limitation on the number of CDMA spreaders 254 that the user terminal 110 may use. A single user terminal may, for example, contain two CDMA spreaders 254 and thereby generate two data channels, in an uplink channel. In such a case, the output of the two CDMA spreaders, after modulation, would be combined by the user terminal 110 before transmission in the uplink beam 112. The individual symbols transmitted in the two data channels could then correspond to the aligned user signals 418 and 422 shown in FIG. 4b.

The operation of the satellite 106 is described next with reference to FIG. 3. The satellite 106 employs an analog to digital converter 310 to convert the analog signals received by the satellite receive antennae (not shown) to digital samples. The digital samples are stored in an input data buffer 314 until the satellite 118 is ready to process them.

The satellite 106 uses a time reference generator 342 to generate internal system and reference clocks, including the symbol reference clock and synchronization word that are transmitted in the downlink beam 108. The time reference generator 342 also produces an epoch marker (signifying the proper alignment of code words) and chip clock that synchronizes the input data buffer 314 and FHT despreader 326 with the symbols in the uplink channels arriving on the uplink beam 112.

The digitized symbols arriving in the uplink channels are stored in the input data buffer 314 are pre-processed in the FFT pre-sum stage 318. The FFT pre-sum stage 318 performs calculations on the digital samples in advance of the wideband FFT processor 322 so that the wideband FFT processor 322 can extract uplink channels more quickly and efficiently. The pre-sum output of the FFT pre-sum stage 318 is then fed into the wideband FFT processor 322 which recovers signals comprising each of the uplink channels.

In order to generate timing correction information for the user terminal 110, the satellite 106 includes a calibration demodulator 330 which monitors the uplink channels processed by the FFT processor 322. In particular, the calibration demodulator 330 removes the modulation applied to the uplink channels so that the control processor 324 may analyze the symbols in the uplink channel. The control processor 324 analyzes the symbols transmitted in the uplink channels, compares their receive timing to the satellite 106 symbol reference, and computes any timing correction information (as discussed above with reference to FIG. 4). The timing correction information is forwarded to the downlink data formatter 338 which may encode, error protect, or otherwise format the data for transmission in the downlink beam 108. The output of the downlink data formatter 338 is typically converted to an analog signal, modulated, and amplified (not shown) before transmission to the user terminal 110.

As mentioned above, the output of the FFT processor 322 is a set of modulated outputs, for example Inphase (I) and Quadrature (Q) signals for QPSK modulation, for each of the uplink channels in the uplink beam 112. Thus, only a single FFT processor 322 is generally needed for each uplink beam 112. In operation, the wideband FFT processor 322 performs the function of a predetection matched filter.

Functioning as a predetection matched filter means that the FFT processor 322 is synchronized to the arrival of symbols in data channels transmitted by the user terminal 110 and need not waste computational resources to interpolate between received symbols. The FFT processor 322 can operate in this manner because the satellite 106 has synchronized the uplink channels to the satellite 106 internal symbol clock and epoch mark and because the satellite 106 controls the clocking of data out of the input data buffer 314. Each modulated output from the wideband FFT processor 322 represents the I-Q signal samples that comprise an uplink channel, and each uplink channel may carry data channels for hundreds of users. In order to work with the individual data for a particular user, however, the modulated outputs are despread to recover the user data.

To accomplish despreading, the satellite 106 uses an FHT despreader 326. Each FHT despreader 326 may process all the user data in an entire uplink channel by working with the I-Q pairs for that uplink channel produced by the wideband FFT processor 322. The FHT despreader 326 uses a signal processing technique known as the Fast Hadamard Transform to recover individual data channels from the uplink channel.

Thus, the output of each FHT despreader 326 consists of I-Q pair outputs representing despread data contained in each data channel present in an uplink channel. In a preferred embodiment, there is one I-Q pair output for each user signal in the uplink channel. The I-Q pairs produced by the FHT despreader 326 may include conventional modulated signals and thus may be demodulated by conventional demodulation circuitry (not shown) for further processing. Furthermore, in a preferred embodiment, the satellite 106 uses an FHT despreader 326 for each uplink channel that the satellite 106 will process. Thus, the satellite 106 may process all the uplink channels in parallel using multiple FHT despreaders 326.

One benefit of synchronizing the uplink channels in the uplink beam 112 is that it becomes possible to use a single FHT despreader 326 to simultaneously (in bulk) decode all of the user data in a particular uplink channel. This is possible because the satellite 106 has synchronized all of the uplink channels in the uplink beam 112 with each other and with the symbol reference clock in the satellite 106. Because the satellite 106 uses the same symbol reference clock for each uplink channel in the uplink beam 112, the satellite 106 can provide a single reference chip clock and epoch mark for all the FHT despreaders 326 operating with uplink channels for the uplink beam 112.

The resultant bulk despreading provides a tremendous savings in satellite size, weight, and power consumption. As noted above, an FHT despreader 326 may be added for each uplink channel anticipated to be put into service in the uplink beam 112 to provide even greater user signal handling capability in the satellite 106.

While particular elements, embodiments and applications of the present invention have been shown and described, it will be understood, of course, that the invention is not limited thereto since modifications may be made by those skilled in the art, particularly in light of the foregoing teaching. It is therefore contemplated by the appended claims to cover such modifications as incorporate those features which come within the spirit and scope of the invention.

What is claimed is:

1. A user terminal adapted for spread-spectrum transmission of data channels in a bulk decodable uplink channel, said user terminal comprising:

a downlink demodulator for producing a demodulated received signal and for extracting a downlink symbol clock from said demodulated received signal;

error correction circuitry connected to said downlink demodulator for extracting a synchronization word from said demodulated received signal and for producing a corrected received signal, said synchronization word provided to a plurality of additional terminals transmitting in said uplink channel;

a data demultiplexer connected to said error correction circuitry for extracting timing correction information from said corrected received signal;

a timing controller outputting a system clock providing code word alignment of a data channel to be transmitted by said user terminal with code words to be transmitted by said additional terminals, said system clock based on said downlink symbol clock, said synchronization word, and said timing correction information;

a spread-spectrum spreader for encoding user data into said data channel; and a transmitter connected to said spread-spectrum spreader for transmitting said data channel in said uplink channel of an uplink beam to a satellite.

2. The user terminal of claim 1, wherein said spread-spectrum spreader is a direct sequence CDMA spreader.

3. The user terminal of claim 2, wherein said user terminal includes an orthogonal code generator connected to said direct sequence CDMA spreader.

4. The user terminal of claim 3, wherein said orthogonal code generator uses Walsh-Hadamard codes.

5. The user terminal of claim 2, wherein said user terminal further comprises a time correlation code generator connected to said CDMA spreader.

6. The user terminal of claim 5, wherein said time correlation code generator uses codes with auto-correlating properties.

7. The user terminal of claim 2, further comprising a switch connected to said direct sequence CDMA spreader, and an orthogonal code generator connected to said switch.

8. The user terminal of claim 7, wherein said orthogonal code generator uses Walsh-Hadamard codes.

9. The user terminal of claim 7, further comprising a time correlation code generator connected to said switch.

10. The user terminal of claim 9, wherein said time correlation code generator uses codes with auto-correlating properties.

11. The user terminal of claim 2, further comprising a data phasing buffer connected to said CDMA spreader, said data phasing buffer storing said user data and controlled by an uplink data clock.

12. The user terminal of claim 1, further comprising a data phasing buffer connected to said spread-spectrum spreader, said data phasing buffer storing user data and controlled by an uplink data clock.

13. A satellite adapted to bulk decode at least one uplink channel comprising a plurality of spread-spectrum data channels in an uplink beam received by said satellite, said satellite comprising:

a timing reference generator for creating a downlink clock, a code word synchronization word, a chip clock, and a code word alignment marker;

a receiver for receiving an uplink channel of said uplink beam, said uplink channel comprising a plurality of data channels;

a control processor for examining at least one symbol contained in said uplink channel and generating timing correction information based on said at least one symbol;

a downlink data formatter connected to the control processor for transmitting said timing correction information, said downlink clock, and said synchronization word to at least one transmitter of said data channels in said uplink channel to provide code word alignment of said data channels;

a wideband FFT processor for said uplink beam and connected to said receiver for producing a modulated uplink channel output representing said uplink channel; and a despreader connected to said FFT processor and said timing reference generator, said despreader simultaneously despreading said modulated uplink channel output into individual modulated data channel outputs under control of said chip clock and said code word alignment marker, thereby bulk recovering said data channels in said uplink channel.

14. The satellite of claim 13, wherein said satellite further comprises:

an input data buffer for storing digitized samples of said uplink channel;

an FFT pre-sum stage for performing advance calculations on said digitized samples in preparation for said FFT processor.

15. The satellites of claim 13, wherein said despreader is an FHT despreader.

16. The satellite of claim 13, wherein said wideband FFT processor produces at least one additional modulated uplink channel output for an additional uplink channel in said uplink beam.

17. The satellite of claim 16, further comprising an additional despreader connected to said FFT processor and said timing reference generator, said additional despreader simultaneously despreading said additional modulated uplink channel output into additional individual modulated data channel outputs under control of said chip clock and said code word alignment marker, thereby bulk recovering additional data channels in said additional uplink channel.

18. A method for spread-spectrum transmission of data channels in a bulk decodable uplink channel, said method comprising:

demodulating a received signal in a user terminal to produce a demodulated received signal;

extracting a downlink symbol clock and a synchronization word from said demodulated received signal, said synchronization word provided to a plurality of additional terminals transmitting in said uplink channel;

extracting timing correction information from said demodulated received signal;

generating a system clock providing code word alignment of a data channel to be transmitted by said user terminal with code words to be transmitted by said additional terminals, said generating step generating said system clock in accordance with said downlink symbol clock, said synchronization word, and said timing correction information;

spreading user data into said data channel; and transmitting said data channel in said uplink channel of an uplink beam to a satellite.

19. The method of claim 18, wherein said spreading step comprises direct sequence CDMA spreading.

20. The method of claim 19, wherein said spreading step applies orthogonal codes to said user data.

21. The method of claim 20, wherein said orthogonal codes are Walsh-Hadamard codes.

22. The method of claim 19, wherein said spreading step applies a time correlation code to timing reference data.

23. The method of claim 22, wherein said time correlation codes are Barker codes.

24. The method of claim 18, further comprising the step of:

storing said user data in a data phasing buffer and clocking said user data out of said data phasing buffer according to an uplink data clock.

25. A method for decoding in bulk a plurality of spread-spectrum data channels in at least one uplink channel of an uplink beam received by a satellite, said method comprising:

generating a downlink clock, a code word synchronization word, a chip clock, and a code word alignment marker onboard a satellite;

receiving in said uplink beam an uplink channel comprising a plurality of data channels;

examining at least one symbol contained in said uplink channel and generating timing correction information based on said at least one symbol;

transmitting said timing correction information, said downlink clock, and said synchronization word to at least one transmitter of said data channels in said uplink channel to provide code word alignment of said data channels;

producing a modulated uplink channel output representing said uplink channel with an FFT processor; and simultaneously despreading said modulated uplink channel output into individual modulated data channel outputs under control of said chip clock and said code word alignment marker, thereby bulk recovering said data channels in said uplink channel.

26. The method of claim 25, wherein said receiving step further comprises:

storing digitized samnples of said uplink channel in an input data buffer;

performing advance calculations in an FFT pre-sum stage on said digitized samples in preparation for said FFT processor.

27. The method of claim 25, wherein said despreading step comprises FHT despreading.

28. The method of claim 25, wherein said step of producing further comprises producing an additional modulated uplink channel output for an additional uplink channel in said uplink beam with said FFT processor.

29. The method of claim 28; wherein said step of simultaneously despreading further comprises simultaneously despreading said additional modulated uplink channel output into additional individual modulated data channel outputs under control of said chip clock and said code word alignment marker, thereby bulk recovering additional data channels in said additional uplink channel.

* * * * *